(12) United States Patent
Yamamoto

(10) Patent No.: US 7,037,052 B2
(45) Date of Patent: May 2, 2006

(54) SPINDLE UNIT OF MACHINE TOOL

(75) Inventor: Tatsuya Yamamoto, Nara (JP)

(73) Assignee: Mori Seiki Co., Ltd., (JP)

( * ) Notice: Subject to any disclaimer, the term of this patent is extended or adjusted under 35 U.S.C. 154(b) by 180 days.

(21) Appl. No.: 10/636,433

(22) Filed: Aug. 7, 2003

(65) Prior Publication Data

US 2004/0028493 A1   Feb. 12, 2004

(30) Foreign Application Priority Data

Aug. 9, 2002   (JP)   ............ P2002-233299

(51) Int. Cl.
*B23B 3/22*   (2006.01)
*B23Q 3/12*   (2006.01)

(52) U.S. Cl. ............ 409/233; 409/201; 409/211; 29/27 R; 82/158

(58) Field of Classification Search ........... 409/233, 409/232, 231, 136, 211, 201, 216, 135; 29/40, 29/39, 27 C, 27 R; 82/159, 161, 158; 408/239 A, 408/239 R See application file for complete search history.

(56) References Cited

U.S. PATENT DOCUMENTS

| | | | | |
|---|---|---|---|---|
| 4,764,064 A | | 8/1988 | Grienke | 409/233 |
| 5,096,347 A | | 3/1992 | Kumagai et al. | 409/233 |
| 6,079,919 A | * | 6/2000 | Zosi | 409/233 |
| 6,193,451 B1 | * | 2/2001 | Asberg | 409/233 |
| 6,473,951 B1 | * | 11/2002 | Nakaminami et al. | 409/233 |
| 6,533,509 B1 | * | 3/2003 | Antoun | 409/233 |

FOREIGN PATENT DOCUMENTS

EP   1053812 A2   11/2000

OTHER PUBLICATIONS

European Search Report dated Oct. 30, 2003 (3 pages).

* cited by examiner

*Primary Examiner*—Boyer D. Ashley
*Assistant Examiner*—Dana Ross
(74) *Attorney, Agent, or Firm*—Osha Liang LLP

(57) ABSTRACT

A column (4) is provided with a hanging jig (holding mechanism) (50) for holding an unclamping apparatus (30) and a spindle head (15) is made to be able to move in an up and down direction by itself by removing a bolt (43) in a state of hanging to hold the unclamping apparatus (30) by the hanging jig (50).

2 Claims, 5 Drawing Sheets

SPINDLE UNIT OF MACHINE TOOL

BACKGROUND OF THE INVENTION

1. Field of the Invention

The present invention relates to a spindle unit of a machine tool having an unclamping apparatus for unclamping a tool from a tool spindle.

2. Related Art

Generally, a spindle unit of a machine tool is provided with an unclamping apparatus for arranging a draw bar for clamping and unclamping a tool to insert into a through hole of a spindle movably in an axial direction and mounting a number of belleville springs for urging a draw bar in a clamping direction and unclamping the tool clamped to the spindle. There is an unclamping apparatus of this kind having a structure in which a cylinder block having a piston driven by, for example, hydraulic pressure is fixed to a rear end wall of a spindle head on a side opposed to the tool and the cylinder block is connected with a hydraulic pipe for supplying hydraulic pressure to the cylinder block, a coolant supply pipe and an electric wiring.

Meanwhile, when maintenance of a tool spindle or replacement of the belleville spring is carried out in the spindle unit, conventionally, it is general to carry out the maintenance or the replacement by removing a total of the unclamping apparatus from the spindle head to move down on the floor and drawing the tool spindle and the draw bar from the spindle head under the state.

However, when the conventional unclamping apparatus is removed to move down on the floor, it is necessary to temporarily remove all of the hydraulic pipe, the coolant supply pipe and the electric wiring connected to the cylinder block and therefore, there poses a problem that in reattaching the unclamping apparatus the respective pipe and the wiring need to connect again to take much time and labor and operational performance is low.

Further, the above-described conventional structure poses a problem that the unclamping apparatus which is a heavy object needs to remove or attach in a state of being supported by the hand of an operator and burden of labor is enormous.

SUMMARY OF THE INVENTION

The invention has been carried out in view of the above-described conventional situation and it is an object thereof to provide a spindle unit of a machine tool capable of promoting operational performance in carrying out maintenance of a tool spindle or replacement of a belleville spring and capable of reducing burden of labor in attaching and removing operation.

(1) The invention is characterized in that in a spindle unit of a machine tool having an unclamping apparatus for rotatably arranging a tool spindle to insert into a spindle head supported by a column movably in an up and down direction, arranging a draw bar for clamping and unclamping a tool to insert into a through hole of the tool spindle movably in the axial direction, mounting a number of belleville springs for urging the draw bar in a clamping direction at the draw bar and moving the draw bar in an unclamping direction on a side of the spindle head opposed to the tool, wherein the unclamping apparatus is made to be attachable and detachable to and from the spindle head, the column is a provided with a holding mechanism for holding the unclamping apparatus, and the spindle head is made to be able to move in the up and down direction by the spindle head per se by separating the unclamping apparatus from the spindle head in a state of holding the unclamping apparatus by the holding mechanism.

(2) The invention is further characterized in that the holding mechanism is constituted to hold the unclamping apparatus at a position substantially coinciding with a moving line of the spindle head.

(3) The invention is further characterized in that the holding mechanism is constituted by a hanging jig attached by utilizing a hole formed at an upper wall portion of the column for handing to hold the unclamping apparatus.

(4) The invention is further characterized in that the holding mechanism is constituted to mount the unclamping apparatus at a mounting shelf fixed to a column.

According to the spindle unit of the invention, when the tool spindle and the draw bar are removed, the unclamping apparatus is held by the holding mechanism by moving the spindle head in the up and down direction and the unclamping apparatus is removed from the spindle head under the state. Thereby, the spindle head is separated from the unclamping apparatus and can be moved in the up and down direction by the spindle head per se. Next, the spindle head is moved in the up and down direction to an operational position and the tool spindle and the draw bar are drawn. Further, in order to integrate the unclamping apparatus again, the spindle head is moved to a position of holding the unclamping apparatus and the unclamping apparatus is fixed to the spindle head.

According to the spindle unit of the invention, the holding mechanism for holding the unclamping apparatus is provided at the column for supporting the spindle head movably in the up and down direction, the spindle head is made to be able to move in the up and down direction by the spindle head per se by removing the spindle head in the state of holding the unclamping apparatus by the holding mechanism and therefore, the unclamping apparatus can be held in the machine in a state of being connected with a hydraulic pipe, a coolant pipe and an electric wiring as they are, a number of operating steps can be reduced and operational performance can be promoted in comparison with the conventional case of removing a total of the apparatus to move down on the floor. Further, burden of labor of the operator can be reduced since the unclamping apparatus is held at the column.

According to the invention, the unclamping apparatus is held at the position substantially coinciding with the moving line of the spindle head and therefore, an amount of moving the unclamping apparatus in removing and attaching operation is reduced, further, positioning of the spindle head and the unclamping apparatus can easily be carried out and operational performance can further be promoted.

According to the invention, the unclamping apparatus is hung to hold by the hanging jig by utilizing the hole formed at the upper wall portion of the column and therefore, the unclamping apparatus can be held by a simple structure while restraining an increase in cost.

According to the invention, the unclamping apparatus is mounted on the mounting shelf fixed to the inner wall of the column and therefore, the unclamping apparatus can be held by a simple structure while refraining an increase in cost.

DETAILED DESCRIPTION OF THE PREFERRED EMBODIMENTS

Embodiments of the invention will be explained in reference to the attached drawings as follows.

Figure 1:
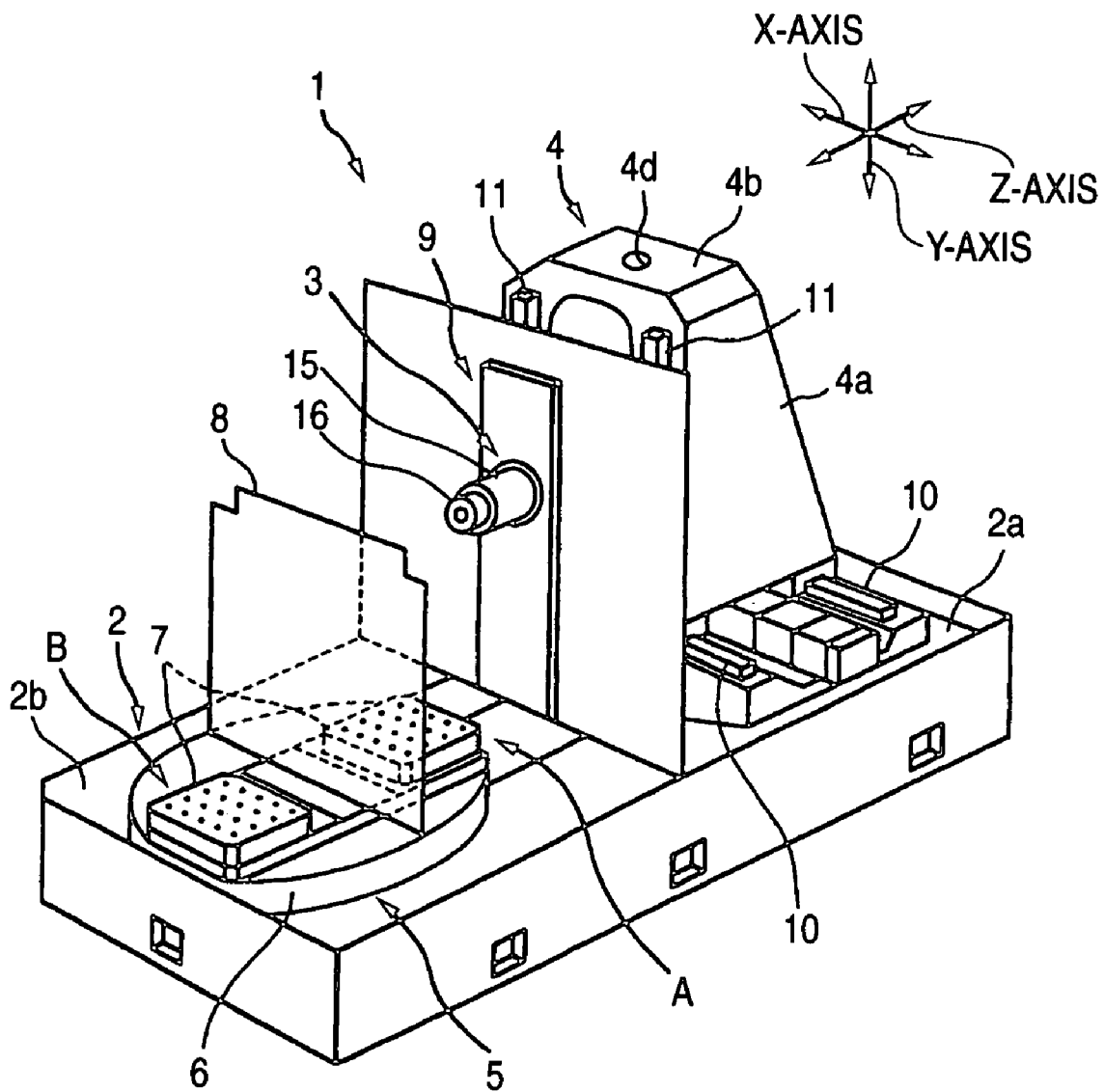
FIG. 1 is a perspective view of a horizontal type machining center arranged with a spindle unit according to the embodiment of the invention.
Figure 2:
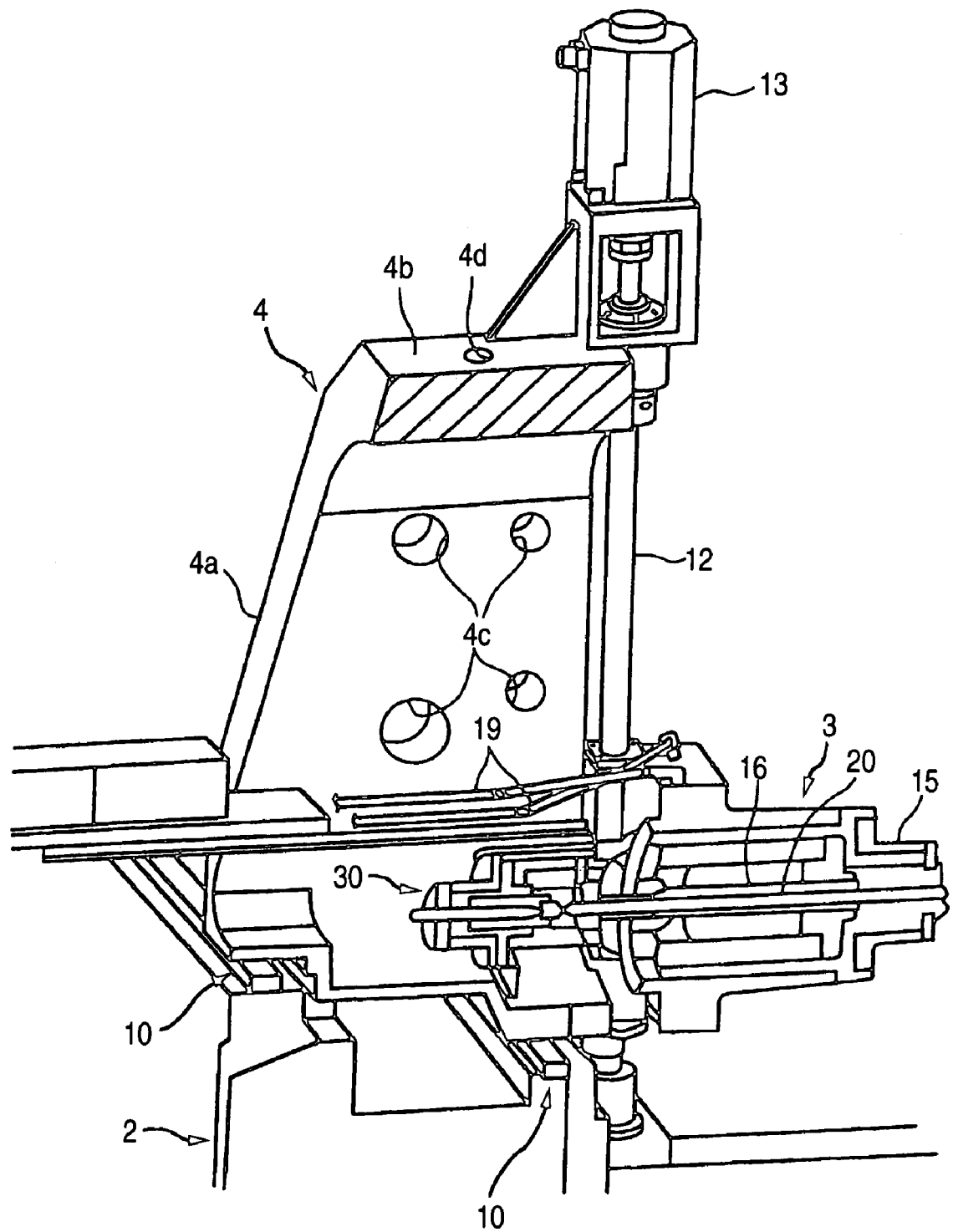
FIG. 2 is a perspective view showing an outline constitution of the spindle unit.
Figure 3:
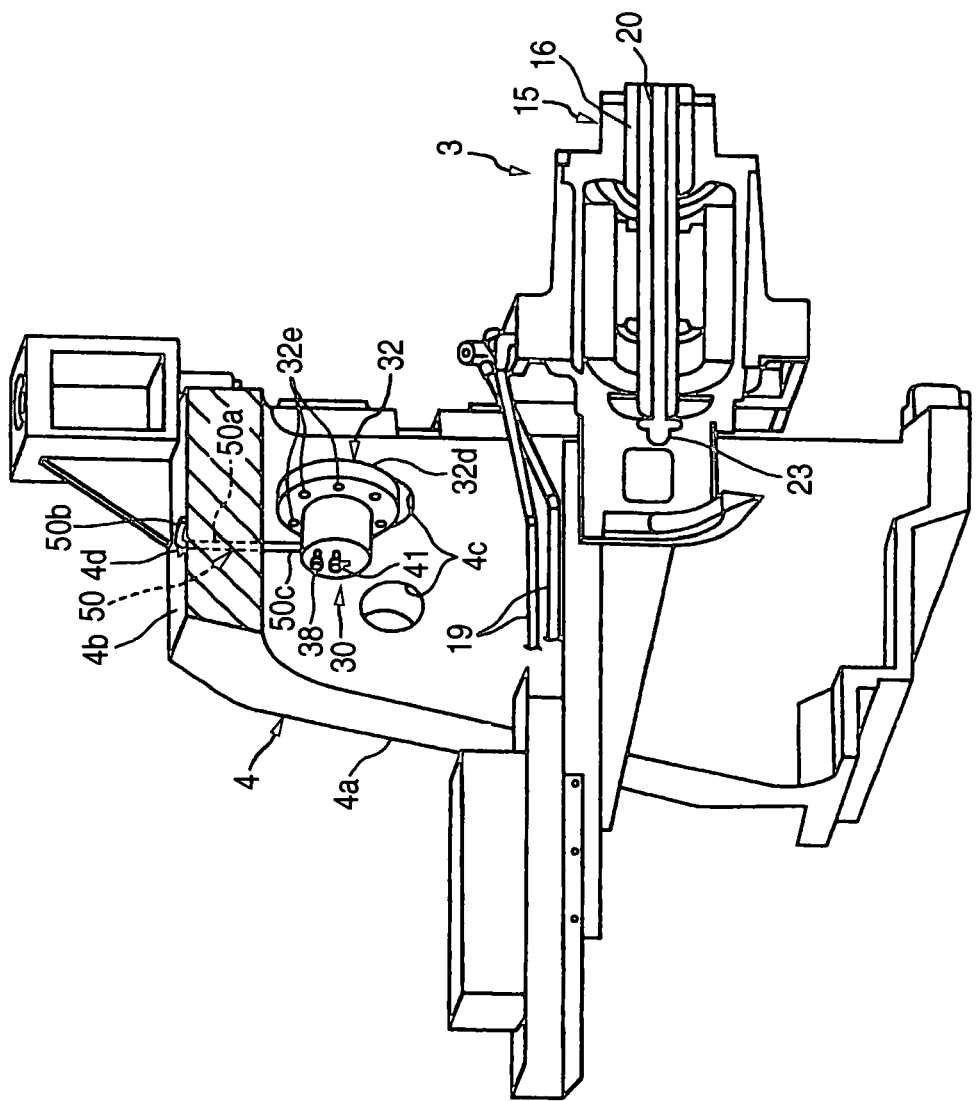
FIG. 3 is a perspective view showing the outline constitution of the spindle unit.
Figure 4:
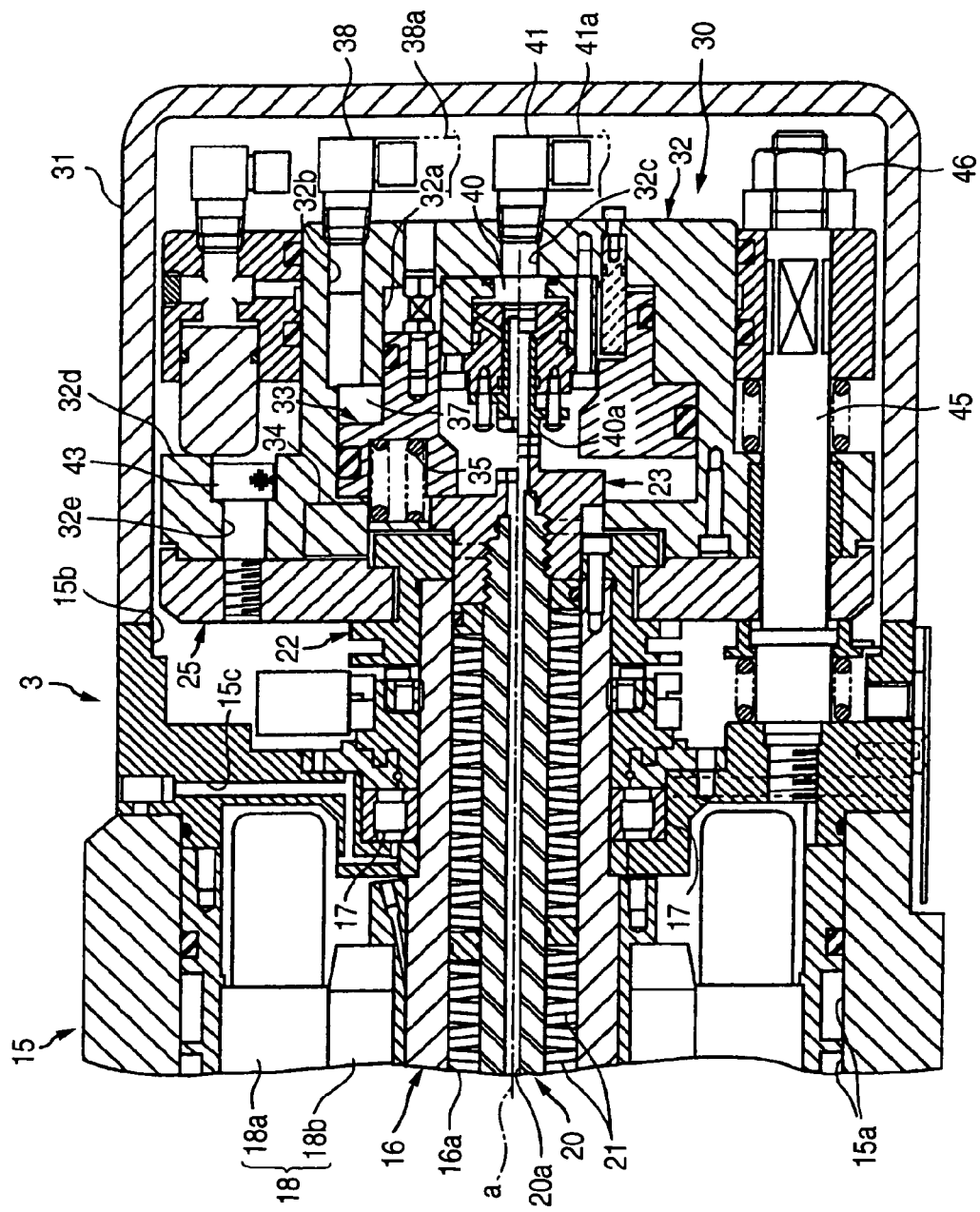
FIG. 4 is a sectional view of a clamping apparatus of the spindle head.

FIG. 1 through FIG. 4 are views for explaining a spindle unit of a machine tool according to an embodiment of the invention, FIG. 1 is a perspective view of a machine tool arranged with a spindle unit according to the embodiment, FIG. 2 and FIG. 3 are perspective views showing an outline constitution of the spindle unit and FIG. 4 is a sectional view of a clamping apparatus of a spindle head.

In the drawings, reference numeral 1 designates a horizontal type machining center (machine tool) which is constructed by a constitution of mounting a column 4 arranged with a spindle unit 3 at a rear portion 2a of a fixed bed 2 and mounting a pallet interchanging apparatus 5 at a front portion 2b thereof. The pallet interchanging apparatus 5 is for turning respective pallets 7, 7 mounted at a turn table 6 between a machining position A and an initial set up position B. Further, reference numeral 8 designates a partition plate for preventing chip or coolant from scattering to the initial set up side and reference numeral 9 designates a shutter for preventing chip from scattering to a feed mechanism side.

The machining center 1 machines a work mounted on the pallet 7 at the machining position A by relatively moving the spindle unit 3 in X-axis, Y-axis and Z-axis directions by driving to rotate a tool (not illustrated) mounted to the spindle unit 3.

The column 4 is constituted by a gate-like shape in front view comprising by integrally coupling upper end portions of left and right side wall portions 4a, 4a by an upper wall 4b and is movable in X-axis direction by linear guides 10, 10 arranged at the fixed bed 2. The left and right side wall portions 4a and the upper wall portion 4b are formed with a plurality of lightening holes 4c and 4d for achieving light-weighted formation.

The spindle unit 3 is arranged at inside of the column 4 to direct an axis core thereof in Z-axis direction and the spindle unit 3 is movable in Y-axis direction by linear guides 11, 11 arranged at front faces of the left and right side wall portions 4a. Further, a right side portion of the spindle unit 3 is engaged with a ball screw 12 and the spindle unit 3 is driven to move up and down by a servo motor 13 connected to an upper end portion of the ball screw 12.

The spindle unit 3 is constructed by a structure of rotatably inserting a tool spindle 16 into a spindle head 15 in a cylindrical shape via a bearing 17 and mounting a tool holder (not illustrated) for gripping a tool at a front end portion of the tool spindle 16 as mainly shown by FIG. 4.

The spindle head 15 is formed with an oil path 15c for supplying lubricant oil to the bearing 17 and the oil path 15c is connected with an oil supply pipe 19.

A spindle motor 18 for driving to rotate the tool spindle 16 is integrated at inside of the spindle head 15. The spindle motor 18 includes a stator 18a fixed to an inner peripheral face of the spindle head 15 and a rotor 18b fixed to an outer peripheral face of the tool spindle 16 to be opposed to the stator 18a. Further, the spindle head 15 is formed with a cooling path 15a to surround the stator 18a and the stator 18a is cooled by making a coolant flow to the cooling path 15a.

A through hole 16a is formed at an axis core of the tool spindle 16 and a draw bar 20 is arranged to insert into the through hole 16a movably in an axial direction. A number of belleville springs 21 constituting an urging device for urging the draw bar 20 in a clamping direction is interposed between the draw bar 20 and the tool spindle 16 and the tool is clamped to the tool spindle 16 by urging the draw bar 20 by the belleville springs 21 in a rear direction (right direction of FIG. 4). Further, an axis core of the draw bar is formed with a supply hole 20a for supplying a coolant to the tool via a valve mechanism 40, mentioned later.

A revolving speed detection member 22 for detecting a number of revolutions of the tool spindle 16 is fixed to fasten to a rear end portion of the tool spindle 16 by a bolt. Further, an end nut 23 is screwed to a rear end portion of the draw bar 20 and the draw bar 20 is fixed to the tool spindle 16 by fastening the end nut 23 while interposing the revolving speed detection member 22.

A rear end portion of the spindle head 15 is arranged with a lid member 25 substantially covering a rear end opening 15b of the spindle head 15 and the lid member 25 is arranged at the revolving speed detection member 22 to be unable to move in an axial direction.

An unclamping apparatus 30 is arranged at a rear end of the spindle head 15. The unclamping apparatus 30 is covered in air tight by a cover 31 attachably and detachably mounted to the spindle head 15. Here, in FIG. 4, a portion of the unclamping apparatus 30 on an upper side of an axis line a indicates an unclamping state and a lower side portion thereof indicates a clamping state.

The unclamping apparatus 30 is generally constructed by a structure in which a piston 33 substantially in a ring-like shape is inserted into a cylinder recess portion 32a of a cylinder block 32 formed substantially in a bowl-like shape opposed to the lid member 25 slidably in an axial direction, a stopper plate 34 which is brought into contact with the piston 33 is fixed to fasten to a front end opening edge of the cylinder recess portion 32a by a bolt and a spring 35 for urging the piston 33 in a retracting direction (clamping direction) is interposed between the stopper plate 34 and the piston 33.

The cylinder block 32 is formed with a hydraulic path 32b for supplying hydraulic pressure to an oil chamber 37 formed by the cylinder block 32 and the piston 33 and a joint 38 for the hydraulic pipe communicating with the hydraulic path 32b is connected to a rear end face of the cylinder block 32. The joint 38 for the hydraulic pipe is connected with a hydraulic pressure supply source via a hydraulic hose 38a. Further, when hydraulic pressure is supplied to the oil chamber 37, the piston 33 is moved forwardly to move the draw bar 20 in an unclamping direction (front side in the axial direction) to thereby release to the tool from clamping. When the hydraulic pressure is released, the piston 33 is retracted by the spring 35 and the draw bar 20 is moved in the clamping direction by the belleville spring 21 to clamp the tool.

The valve mechanism 40 is arranged at inside of the piston 33 and at a bottom wall of the cylinder recess portion 32a. The valve mechanism 40 is constituted to communicate a coolant path 32c formed at the cylinder block 32 and the supply hole 20a of the draw bar by moving a valve piston 40a forwardly when the draw bar 20 is moved rearwardly to the clamping position and close the coolant path 32c by moving the valve piston 40a rearwardly when the draw bar 20 is moved forwardly to the unclamping position. A coolant pipe joint 41 communicating to the coolant path 32c is connected to a rear end face of the cylinder block 32 and the joint 41 is connected with a coolant supply source via a coolant hose 41a.

A flange portion 32d is formed at an outer periphery of the cylinder block 32. The flange portion 32d is formed with bolt holes 32e at predetermined intervals in a peripheral direction and each bolt hole 32e is mounted with a bolt 43. Further, the cylinder block 32 is fixed to fasten to the lid member 25 by the respective bolts 43.

Further, the flange portion 32d is mounted with a fixing bolt 45 having a structure different from that of the bolt 43. The fixing bolt 45 is fastened to the spindle head 15 by penetrating the lid member 25 and a nut 46 is fastened to a rear end portion of the fixing bolt 45. The cylinder block 32 can be removed from the spindle head 15 by loosening to remove the respective bolts 43 and the nut 46 of the fixing bolt 45.

Further, the apparatus of the embodiment is provided with a hanging jig 50 as a holding mechanism for holding the unclamping apparatus 30 at inside of the column 4. The hanging jig 50 is constructed by a constitution of forming a hook portion 50b engaged with an edge portion of the hole 4d of the upper wall portion 4b at an upper end of a hanging member 50a in a rod-like shape and integrally forming a fixing portion 50c for attaching to fix the cylinder block 32 at a lower end thereof. A screw portion (not illustrated) is provided at a front end of the fixing portion 50c and the cylinder block 32 can be fixed by engaging the screw portion and a screw portion (not illustrated) at an upper portion of an outer periphery of the cylinder block 32. Further, the hanging jig 50 holds the cylinder block 32 and therefore, the unclamping apparatus 30 at a position coinciding with a moving line of the spindle head 15.

Next, operation and effect of the embodiment will be explained.

When maintenance of the tool spindle 20 or replacement of the belleville spring 21 is carried out, first, the hanging jig 50 is inserted into the hole 4d of the column 4 and the hook portion 50b is engaged with the edge portion of the hole 4d. The spindle head 15 is moved to come to a position at which the unclamping apparatus 30 can be hung by the fixing portion 50c of the hanging member 50, the cover 31 is detached and the cylinder block 32 is attached to the fixing portion 50c and the respective bolts 43 and the nut 46 are loosened to remove under the state. Thereby, the cylinder block 32 is held to hang by the hanging jig 50 to separate from the spindle head 15. Next, the spindle head 15 is lowered to an operational position, the end nut 23, the draw bar 20 and the belleville springs 21 are drawn to the rear side and the tool spindle 16 is drawn to the front side. Further, in order to integrate the unclamping apparatus 30 again, the spindle head 15 is moved to a position of holding the cylinder block 32, the cylinder block 32 is fastened to fix to the spindle head 15 by the respective bolts 43 and the nut 46 which have been removed, the cylinder block 32 is released from being fixed to the hanging member 50 and the cover 31 is attached thereto.

In this way, according to the embodiment, the hanging member 50 is provided at the column 4 supporting the spindle head 15 movably in an up and down direction, the respective bolts 43 are loosened to removed in a state of hanging to hold the cylinder block 32 of the unclamping apparatus 30 at the hanging member 50 to thereby separate the spindle head 15 movably in the up and down direction and therefore, the unclamping apparatus 30 can be held in the machine while the hydraulic hose 38a, the coolant hose 41a or an electric wiring stays to be connected to the cylinder block 32 and a number of operating steps can be reduced and operational performance can be promoted in comparison with the conventional case of removing a total of the apparatus to move down on the floor.

Further, there is carried out only operation of moving the spindle head 15 such that the cylinder block 32 is disposed at the fixing portion 50c of the hanging member 50 and attaching the cylinder block 32 to the handing member 50 to hang down under the state and burden of labor can be reduced in comparison with the case of carrying the cylinder block 32 by the hand of the operator to move down on the floor.

According to the embodiment, since the cylinder block 32 is held at the position coinciding with the moving line of the spindle head 15 by the handing member 50, positioning of the cylinder block 32 with the spindle head 5 in removing or attaching the cylinder block 32 can easily be carried out and operational performance can further be promoted.

Further, since the cylinder block 32 is held to hang down by the hanging member 50 by utilizing the lightning hole 4d formed at the upper wall portion 4b of the column 4 and therefore, the cylinder block 32 can be held by a simple structure while restraining an increase in cost.

Further, it is also possible to use a wire as a hanging member, fix the cylinder block by the wire and hang the cylinder block from the hole.

Figure 5:
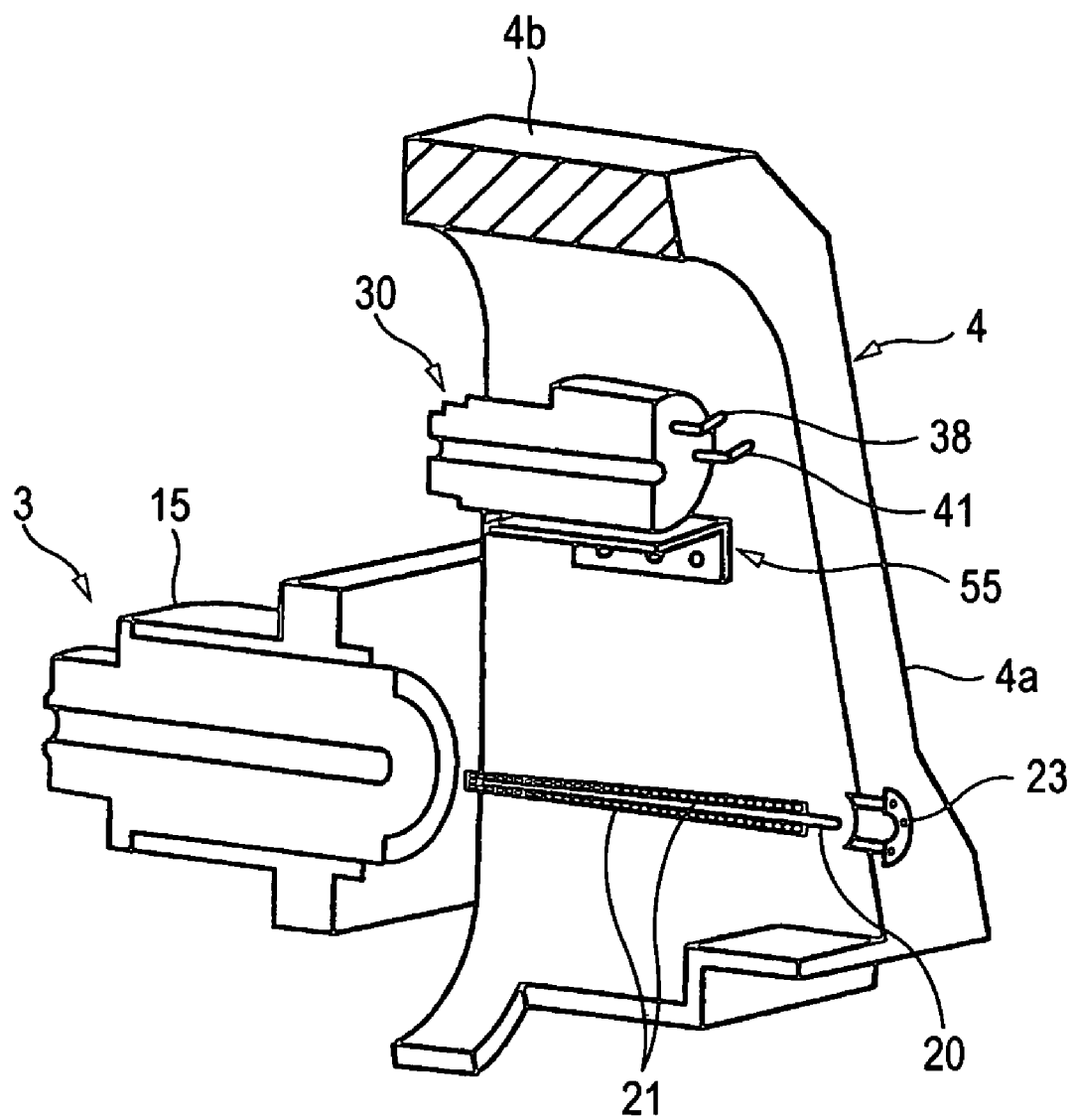
FIG. 5 is a perspective view showing an outline constitution of a spindle unit according to another embodiment of the invention.

Further, although according to the above-described embodiment, an explanation has been given of a case of holding the cylinder block 32 by the hanging jig 50, according to the invention, as shown by FIG. 5, the unclamping apparatus 30 may be mounted on a mounting shelf 55 fixed to the column 4 to hold.

The mounting shelf 55 is fastened to fix to an inner side of the side wall portion 4a of the column 4 by a bolt. Further, when maintenance is carried out, the unclamping apparatus 30 is removed from the spindle head 15 to mount on the mounting shelf 55, the spindle head 15 is lowered to the operational position and the draw bar 25 and the end nut 23 are drawn. Also in this case, the cylinder block 32 can be held by a simple structure while restraining an increase in cost to achieve an effect similar to that of the above-described embodiment.

What is claimed is:

1. A spindle unit of a machine tool comprising:
   a spindle head in which a tool spindle is rotatably provided;
   a column supporting the spindle head movably in an up and down direction;
   a draw bar inserted into a through hole of the tool spindle, the draw bar is movable in an axial direction thereof, thereby clamping and unclamping a tool to be attached;
   an urging device urging the draw bar toward a clamping direction;
   an unclamping apparatus for moving the draw bar toward an unclamping direction; and
   a holding mechanism for holding the unclamping apparatus with the column,
   wherein the unclamping apparatus is able to be detached from the spindle head while being held in the column, and the spindle head is able to move in the up and down direction without having the unclamping apparatus, and wherein that the holding mechanism includes a hanging jig attached by utilizing a hole formed at an upper wall portion of the column for hanging to hold the unclamping apparatus.

2. The spindle unit of a machine tool according to claim 1, wherein the holding mechanism holds the unclamping apparatus at a position substantially coinciding with a moving line of the spindle head.

* * * * *

UNITED STATES PATENT AND TRADEMARK OFFICE
CERTIFICATE OF CORRECTION

| | |
|---|---|
| PATENT NO. | : 7,037,052 B2 |
| APPLICATION NO. | : 10/636433 |
| DATED | : May 2, 2006 |
| INVENTOR(S) | : Tatsuya Yamamoto |

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (101) days Delete the phrase "by 180 days" and insert --by 236 days--

Signed and Sealed this

Ninth Day of December, 2008

JON W. DUDAS
*Director of the United States Patent and Trademark Office*